(12) United States Patent
Robert et al.

(10) Patent No.: US 9,840,375 B2
(45) Date of Patent: Dec. 12, 2017

(54) DEVICE FOR TRANSFERRING MOVING PARTS

(71) Applicant: VISIO NERF, Nuaille (FR)

(72) Inventors: Pierre Robert, Cholet (FR); Laurent Queveau, Mûrs Erigné (FR)

(73) Assignee: VISIO NERF, Nuaille (FR)

( * ) Notice: Subject to any disclaimer, the term of this patent is extended or adjusted under 35 U.S.C. 154(b) by 0 days.

(21) Appl. No.: 15/510,944

(22) PCT Filed: Sep. 22, 2015

(86) PCT No.: PCT/IB2015/001663
§ 371 (c)(1),
(2) Date: Mar. 13, 2017

(87) PCT Pub. No.: WO2016/042394
PCT Pub. Date: Mar. 24, 2016

(65) Prior Publication Data
US 2017/0275103 A1   Sep. 28, 2017

(30) Foreign Application Priority Data
Sep. 19, 2014   (FR) .................................... 14 02101

(51) Int. Cl.
*B65G 47/84*   (2006.01)
*B65G 29/02*   (2006.01)
(Continued)

(52) U.S. Cl.
CPC ............ *B65G 47/848* (2013.01); *A01K 43/00* (2013.01); *B65G 29/02* (2013.01); *B65G 43/08* (2013.01);
(Continued)

(58) Field of Classification Search
CPC .................. B65G 47/848; B65G 29/02; B65G 2201/0208; B65G 43/08; B65G 47/904; B65G 47/915; B65G 47/917; A01K 43/00
See application file for complete search history.

(56) References Cited

U.S. PATENT DOCUMENTS 3,230,001 A * 1/1966 Hirt ........................ A01K 43/00
                                                                294/184
3,929,234 A * 12/1975 Warren ................... B65B 23/08
                                                                198/430
(Continued)

FOREIGN PATENT DOCUMENTS

JP          2003/071388 A     3/2003
WO           88/05416 A1      7/1988
(Continued)

OTHER PUBLICATIONS

International Search Report for No. PCT/IB2015/001663 dated Jul. 12, 2016.

*Primary Examiner* — Mark A Deuble
(74) *Attorney, Agent, or Firm* — Merchant & Gould P.C.

(57) ABSTRACT

A part-processing machine having, in series, consecutive parts on a belt (2) moving same along a main conveying line. Selectively identified non-compliant parts are removed from the conveying line, into a transfer device (1) by pickup tools (8) supported on the periphery of a rotating drum (6) mounted transversely to the conveying line and arranged to rotate about itself so as to pass over the belt, enabling the non-compliant parts to be picked up by the pickup tools and released once the parts have been transported away from the conveying line. The pickup tools have pneumatic gripping heads, more particularly for example suction cups. The pneumatic gripping heads are depressurized relative to the surrounding air by a low-pressure chamber provided inside the drum, to which each head is connected by a tube inside a tool support arm.

15 Claims, 4 Drawing Sheets (51) Int. Cl.
    *B65G 43/08*    (2006.01)
    *A01K 43/00*    (2006.01)
    *B65G 47/91*    (2006.01)
    *B65G 47/90*    (2006.01)

(52) U.S. Cl.
    CPC ......... *B65G 47/904* (2013.01); *B65G 47/917* (2013.01); *B65G 2201/0208* (2013.01)

(56) References Cited

U.S. PATENT DOCUMENTS

| | | | | |
|---|---|---|---|---|
| 4,768,919 | A * | 9/1988 | Borgman | B65G 47/91 53/495 |
| 5,220,993 | A | 6/1993 | Scarpa et al. | |
| 7,540,369 | B2 * | 6/2009 | Momich | B65B 35/46 198/418 |
| 2004/0139989 | A1 * | 7/2004 | Ilich | A01K 45/007 134/22.11 |
| 2009/0314691 | A1 * | 12/2009 | Hebrank | A01K 43/00 209/511 |
| 2015/0071741 | A1 * | 3/2015 | Schnupper | A01K 43/00 414/225.01 |

FOREIGN PATENT DOCUMENTS

| | | |
|---|---|---|
| WO | 00/54579 A1 | 9/2000 |
| WO | 03/002413 A2 | 1/2003 |
| WO | 2004/078623 A1 | 9/2004 |
| WO | 2006/088362 A2 | 8/2006 |

* cited by examiner

DEVICE FOR TRANSFERRING MOVING PARTS

This application is a National Stage Application of PCT/IB2015/001663, filed 22 Sep. 2015, which claims benefit of French Patent Application No. FR 14/02101, filed 19 Sep. 2014 and which applications are incorporated herein by reference. To the extent appropriate, a claim of priority is made to each of the above disclosed applications.

BACKGROUND OF THE INVENTION

The present invention consists in an installation for processing moving parts of the type including a sorting station adapted to transfer individually identified parts from a set of parts moving as a series of successive parts by picking them up selectively in a collecting space to transfer them into a receiving space. It more particularly concerns the conditions encountered for example in industrial installations in the agrifoods field when the parts to be sorted are organized into lines and rows of successive parts and are fragile or otherwise delicate to manipulate, for whatever reason. This is not the only difficulty to be overcome. Most of the time the parts to be processed are small and very numerous and it must be possible to process them with a high throughput in the sorting station, the objective of sorting being for example to separate the parts as a function of a quality of conformance or non-conformance with defined prescriptions by orienting them in two different channels.

SUMMARY OF THE INVENTION

In applications for processing poultry eggs, previous patents of the Applicant provide for the use of a matrix of transverse tools to pick up eggs to be removed in a moving egg rack and depositing them outside the main line of movement, which is reserved for eggs termed standard. Other devices applying to the processing of eggs are the subject matter of the documents JP 2003 071388 and WO 00/54579. In the first of those documents, eggs deemed non-standard for the intended subsequent use are eliminated from the production line between two conveyor belt units. In the second, an egg transfer device is described consisting of a matrix of suction cups that move to-and-fro between two egg racks, picking up eggs in a first of the racks and depositing them in the other one. Each suction cup is controlled to move between two positions and to pick up an egg in one of these positions and to release it in the other one. Installations of this kind involve costly mechanisms and apparatus that are complex in terms of their structure as much as their operation. They can even less lend themselves to high throughputs in that they are incompatible with processing of parts in series moving continuously relative to the matrix of suction cups.

This is why, in arriving at the present invention, rotary drum type transport devices were selected. In fact drum devices of this kind are already known in entirely different fields, as notably described in the patent document U.S. Pat. No. 5,220,993 or possibly in the documents WO 2004/078623 and WO 1988/05416 for transporting objects from one place to another by moving them individually by means of holding tools carried by a rotary drum driven to rotate upon itself.

However, these heavy and costly devices are in no way able to address the targeted objectives in the field of the invention. The latter draws its inspiration from the principle of a rotary drum the periphery of which is driven to travel over a collecting surface on which the parts to be picked up are located to arrive at an original and efficient solution respecting the requirements for a high throughput of small parts to be processed in large numbers as well as the desirable precautions for picking up fragile parts, including operating safety. From this latter point of view it is to be noted for example that in the case of installations for sorting poultry eggs as a function of the results of visual inspection operations, each egg picked up on a main conveyor line must be able to be picked up without risk of it breaking and to be transported away from the conveyor line without running the risk of being released above it, because that would lead to the destruction of many surrounding eggs and necessitate stopping of the production line.

With the above objectives in mind, the present invention consists in an installation for processing parts presenting as series of successive parts on a belt driving them in movement along a main conveyor line that includes, in a station for extraction of selectively identified parts termed non-standard, a device for transferring identified non-standard parts including a rotary drum that is adapted to extract them from the conveyor line, to transport them away from said conveyor line and to release them by depositing them away from the conveyor belt.

These operations are effected by the action of pick-up tools carried at the periphery of a rotary drum mounted transversely to the conveyor line and adapted to rotate upon itself to sweep the belt to enable non-standard parts to be picked up by said pick-up tools and to release them once transported away from the conveyor line. The pick-up tools are of the type with a pneumatic holding head, notably suction cups, for example. The latter are depressurized relative to the surrounding air by means of a low-pressure chamber inside the drum to which each of them is connected by an internal duct an arm carrying the tool that is equipped with an automatic valve to open or to close the pneumatic circuit passing through this duct.

BRIEF DESCRIPTION OF THE DRAWINGS

The invention will now be described more completely in relation to preferred features and their advantages with reference to FIGS. 1 to 6, in which.

To illustrate the invention best in terms of its inherent features, their structure and their operation in relation to one another, there is therefore considered a particular embodiment of the invention according to which the installation for processing moving parts is an installation for processing poultry eggs through which eggs to be processed pass along a conveyor line with each of them disposed in a transport rack cell.

In each rack each of the eggs is received in one of the cells of a rack and the various racks are driven one after the other on the conveyor line so that the eggs present arranged in series of parallel columns.

The eggs therefore pass through the installation in continuous movement but at a speed that is not necessarily constant through a station for extracting parts previously identified as non-standard in relation to the prescriptions set for the parts continuing their travel on the conveyor line. In the situation considered where the parts are eggs, the non-standard parts will have been identified as such in a visual inspection station preceding the extraction station.

According to the invention this station for extracting eggs identified as non-standard includes a rotary drum transfer device that is designed and adapted to pick up each non-standard egg individually by means of a pick-up tool with a pneumatic holding head and to move it away from the conveyor line.

To be more precise, in the selected embodiment of the invention each egg-holding head in question is a suction cup situated at the end of a carrier arm of tubular shape in which there is a duct for depressurizing the suction cup.

The various suction cups are situated at the periphery of the drum. They are fixed by their carrier arm around a cylinder that the drum includes. It is this cylinder which, when the installation is operating, is driven to rotate upon itself about an axis oriented transversely to the conveyor line. To be more specific, in the simplest possible terms the mounting axis is oriented perpendicularly to the conveyor line, which is assumed to be longitudinally rectilinear.

The rotating cylinder, often referred to as the roller hereinafter, constitutes with the arms carrying the suction cups what will often and with reference to the figures be termed means for supporting the various suction cups.

According to the invention, each arm carrying a suction cup is equipped with a valve shown here as a slide valve that is remote-controlled to open or close the communication between the internal duct of the corresponding suction cup carrier arm and a low-pressure chamber inside the drum, and therefore in practice inside the cylinder that is driven in rotation. For convenience of assembly this is an annular chamber forming a fixed enclosure around the shaft supporting the rotary assembly.

When the valve is closed, the suction cup communicates with the surrounding air via an orifice in the wall of the duct inside the arm on the outside of the rotating cylinder. The command to open the valve moves a plug to free an opening or orifice for communication with the low-pressure chamber inside the roller. The suction cup is therefore depressurized and closes onto the facing egg.

DETAILED DESCRIPTION OF THE PREFERRED EMBODIMENTS

In the context of the application described and shown in the figures, each suction cup that has picked up a non-standard egg to extract it from the conveyor line must be released from it away from that line before returning as the drum rotates to a position above the conveyor belt.

In the installation when operating, each egg taken away by the rotary drum transfer device will be deposited in a bin for receiving rejects or in a receiving belt driving it toward a secondary conveyor line when the carrier arm of the corresponding suction cup is facing that bin or belt in a different position of the drum, after the drum has completed a portion of its rotation cycle before it comes back above the conveyor line.

Figure 1:
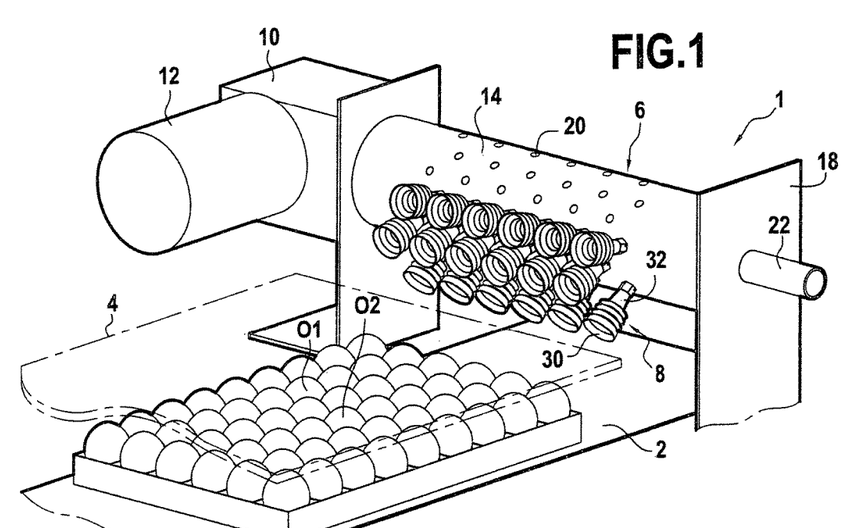
FIG. 1 shows a rotary drum transfer device operating above a belt conveying racks filled with eggs.
Figure 2:
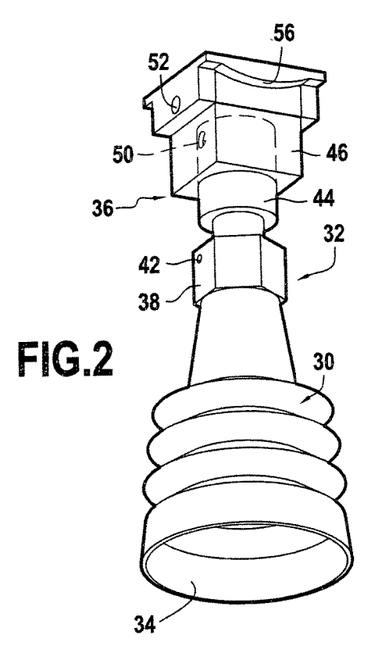
FIGS. 2 and 3 are perspective views of the egg pick-up tools of the device from FIG. 1, respectively assembled and exploded.

The device for transferring non-standard eggs that picks them up from the conveyor belt 2 driven along the main conveyor line is represented at 1 in FIG. 1. It is disposed in the egg extraction station above the belt 2, which has a plane of movement of the eggs and a longitudinal axis of advance of the eggs on the conveyor line, the latter passing under the whole of the rotary drum. The bin that is to collect the eggs extracted from the belt 2 moving the standard eggs is illustrated by receiving means 4 situated above the main belt at a level that is nevertheless lower than the high level reached by the suction cups as the drum rotates. These receiving means are disposed so as to be within range of the suction cups when they go to a particular position of releasing the eggs during the rotation of the rotary drum but do not pass under the drum. If there is no fixed reject bin for non-standard eggs, it may be replaced by egg racks collecting the non-standard eggs on a secondary conveyor line, the receiving means 4 then being a conveyor belt moving perpendicularly to the belt 2 alongside the rotary drum.

Figure 6:
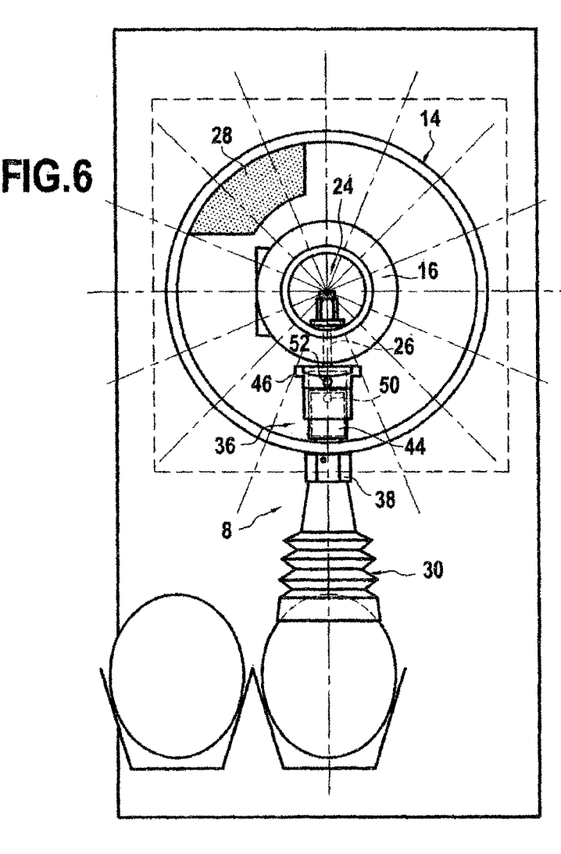
FIGS. 6 to 9 illustrate steps of picking up and releasing eggs during the operation of the transfer device transporting them away from the conveyor belt.
Figure 7:
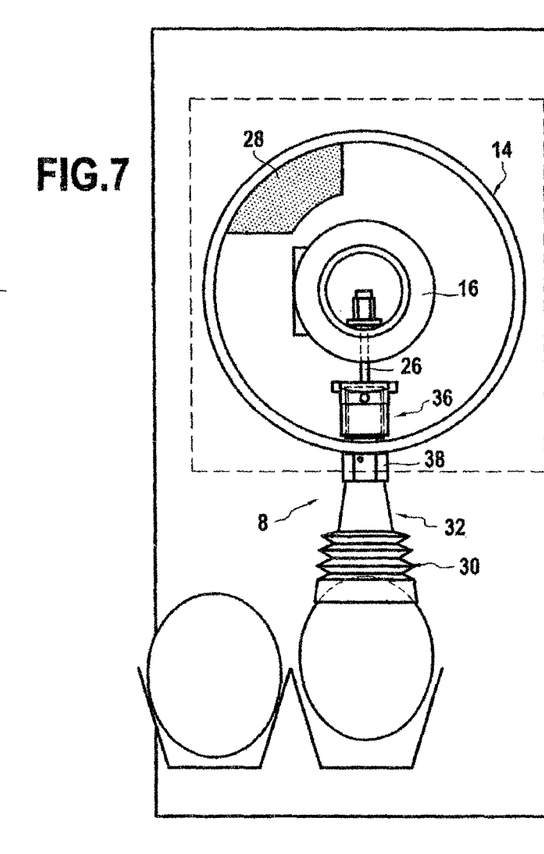

FIG. 1 of the appended drawings in conjunction with FIGS. 6 and 7 shows the means 6 supporting the suction cup pick-up tools 8 and drive means 10 for driving these support means in rotation and a control module 12 for controlling the rotation of the support means synchronously with the movement of the eggs on the main belt.

The means supporting the pick-up tools consists in a roller 14 of annular section delimited radially by two coaxial cylinders and longitudinally by plates inside the end walls 18 that hermetically seal the pressure chamber between the two cylinders. The shaft carrying the roller may be mounted relative to the walls 18 in oblong openings to allow its position to be adjusted after mounting it to a level nearer or farther away from the belt 2 in agreement with the movement of the suction cups into a holding position relative to the level of the moving eggs.

The roller 14 is mounted to rotate about a hollow shaft 22 (FIG. 1) that for its part is fixed relative to the conveyor belt. The roller extends axially along the shaft so that the ends of the shaft project on either side from the axial ends of the roller. The shaft and the corresponding roller are positioned on the one hand parallel to the plane of movement of the parts and on the other hand perpendicularly to the longitudinal axis along which those parts advance.

The pressure chamber formed inside the roller 14 and extending as far as the internal cylinder 16 around the hollow shaft 22 is depressurized by a vacuum pump. A pipe, not visible here, connects the interior of the roller and the vacuum pump and because the roller is driven in rotation this pipe passes through the center of one of the end walls 18 and extends inside the shaft. Rotary seals are provided around the pipe where it passes through the end wall in order to seal the roller and to preserve the low pressure therein.

The pick-up tools around the roller occupy all of the periphery of the drum. Their dimensions and their distribution (distribution diameter, angle between two rows of tools, distance between two tools of the same row) are adjusted as a function of the geometry of the egg racks and their cells for receiving eggs.

The suction cup 30 at the end of each pick-up tool 8 is mounted at the end of a carrier arm forming a hollow intermediate part 32 that is fixed to the roller 14 through openings 20 provided its external cylinder for this purpose. Each suction cup has a pick-up free end 34 the shape of which may be adapted to the type of parts to be picked up. In the case shown of an installation for visual inspection of eggs, the free end of the suction cup is substantially annular. The inside of the suction cup is open in communication with the internal duct of the intermediate part 32 on the pneumatic circuit connecting it to the vacuum chamber inside the rotary roller.

The intermediate part constituting the carrier arm of each pick-up tool forms two portions situated on either side of the external cylinder of the roller, an internal adjustment portion 36 in the annular space between the two cylinders and an external portion 38 for supporting the suction cup outside the roller, and these two portions of the intermediate part are adapted in one position to block the communication between the depressurized interior of the roller 14 and the suction cup 30 and in another position to allow that communication.

The support portion 38 makes it possible to fix the suction cup 30 that is open at its bottom 40 and the adjustment portion 36 one against the other. This support portion, which in the figures has a hexagonal nut exterior shape, includes a transverse venting orifice 42.

Figure 3:
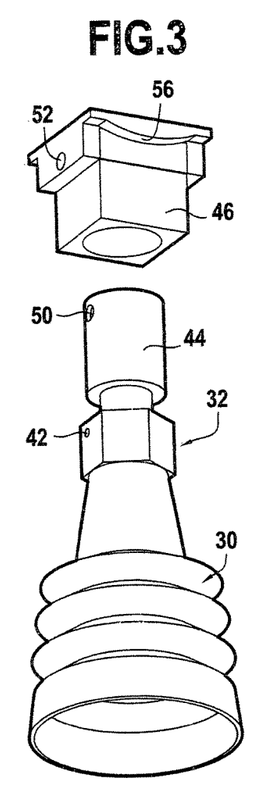
Figure 4:
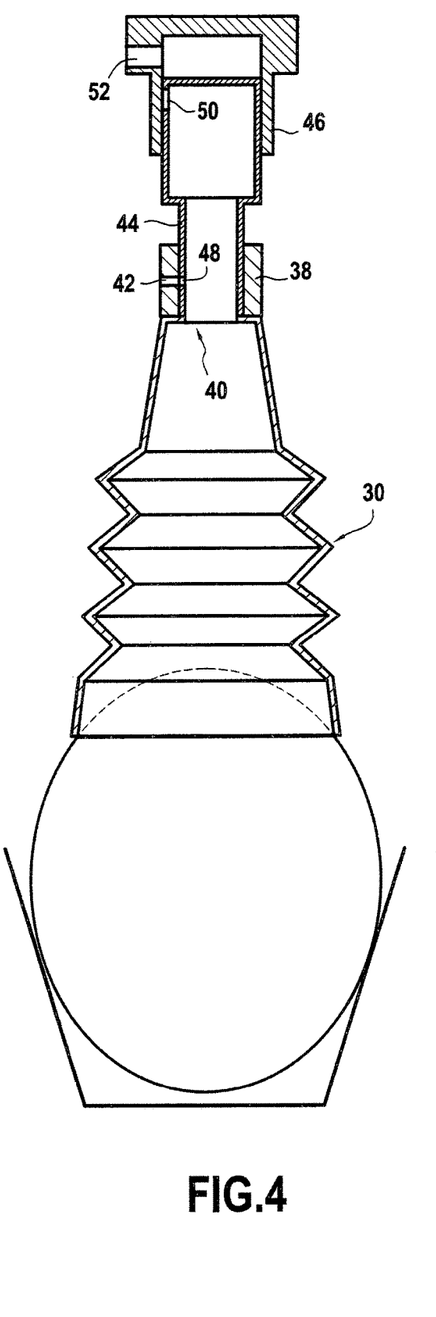
FIGS. 4 and 5 are sectional side views showing one of the pick-up tools and the egg to be picked up in two distinct positions of disengagement and engagement.
Figure 5:
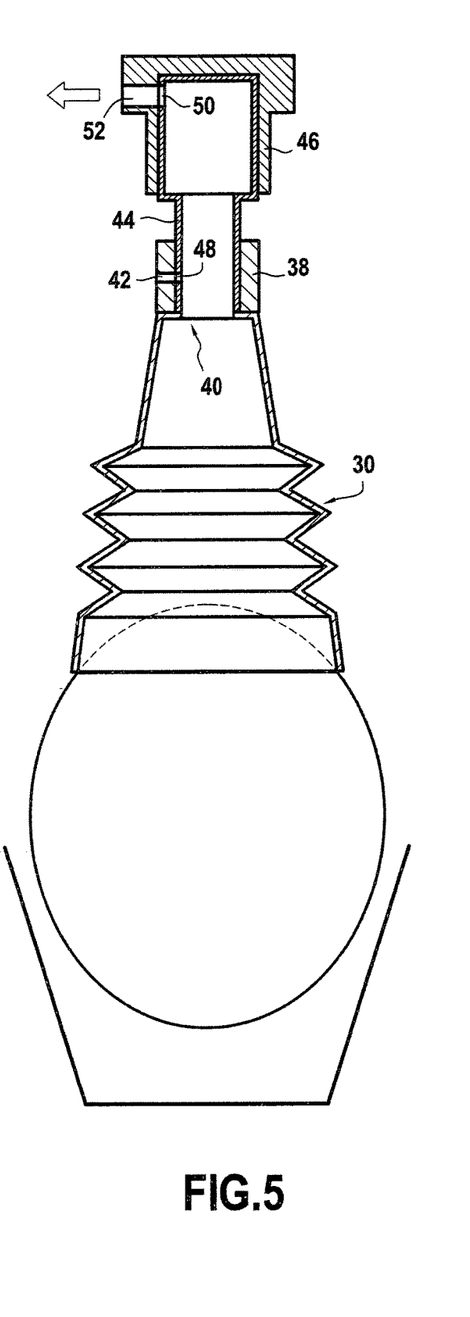

The adjustment portion 36 includes a hollow tube 44 fastened to the suction cup 30 at a first end and a plug 46 mounted around the second end of the tube and free to move along the tube. The plug 46 is mobile in translation between a disengaged position (visible in FIG. 3) in which the corresponding suction cup is able to release an egg that has been picked up and removed from the conveyor belt or unable to pick up one of them on that belt and an engagement position (visible in FIG. 4) in which the corresponding suction cup is able to pick it up on the belt and to hold onto it while it is transferred to the position at which it will be deposited in the bin 4 on the belt receiving non-standard eggs.

The tube 44 is fixed relative to the support portion 38. It includes a transverse orifice 48 brought to face the transverse venting orifice 42 of the support portion. As a result, a flow of external air penetrates continuously to the interior of the suction cup, even when the pick-up free end 34 of the suction cup is in contact with an egg.

The tube 44 and the mobile plug 46 each include a lateral orifice 50 and 52. The plug is mobile between two extreme positions, a first extreme position allowing the superposition of the lateral orifices whereas the second extreme position plugs the lateral orifice 50 of the tube.

The first position is defined as an engagement position, the mobile plug then being able to move toward the suction cup, i.e. to be pushed against the internal face of the lateral wall of the roller. Communication is then established between the suction cup and the interior of the depressurized roller, which makes it possible to pick up an egg by suction when in contact with the pick-up free end of the suction cup.

The venting orifice 42 has a minimum diameter, in any event one that is clearly less than the diameter of the lateral orifices of the tube 44 and the plug 46 adapted to be superposed. The small hole consisting of the orifice 42 allows the surrounding air to pass through it to penetrate into the suction cup at all times but when the plug is in the engagement position the flow of air aspirated by the vacuum pump is much greater than the flow of air through this small hole and provides sufficient depressurization in the suction cup to suck up the egg.

In the engagement position communication is established between the suction cup and the depressurized roller via the intermediate part whereas in the disengagement position the adjustment portion does not communicate with the interior of the roller. This is reflected inside the roller by the fact that in the engagement position the mobile plug of the adjustment portion is situated in the vicinity of the wall of the roller whereas in the disengagement position the mobile plug of the adjustment portion is situated at a distance from the wall of the roller.

In each pick-up tool, the pierced tube of the arm carrying the suction cup constitutes with its plug a slide valve on the pneumatic circuit between the vacuum pump inside the drum and the suction cup of the tool. These various valves for opening and closing the duct feeding the various suction cups are under the control of cylinders the piston rods of which pass through the hollow shaft and the body of which is situated in the space 24 inside the shaft, at the center of the roller. One of these two cylinders is represented by its piston rod 26 in FIGS. 6 to 9.

As can be seen in FIGS. 6 to 9, cam means 28 extend inside the roller between the lateral wall and the central shaft. The cam is mounted in a fixed spatial position independent of the rotary equipment of the drum, advantageously by fixing it to one of the end walls 18. The function of this cam is to force the pick-up tools to assume a disengagement position when they encounter the cam as the roller rotates. The cam is disposed so as to force the support portions into the disengagement position when the roller is in a given angular position, corresponding here to three quarters of a turn after the position in which the same tool is in place to pick up the egg on the belt 2 that is facing it, if necessary.

To this end, the plug 46 includes a flange 54 that extends radially outward the end of the plug facing away from the suction cup. This flange includes a boss 56 adapted to cooperate with the shape of the cam 28. Note that the cam includes a ramp of which one end 58 (FIG. 9), termed the initial end or leading face, extends at a distance from the lateral wall that is substantially equal to the distance to which the boss of the same wall extends when the plug is in the engagement position and the other end 60 of which, termed the final end, extends at a distance from the lateral wall and is substantially equal to the distance to which the boss of the same wall extends when the plug is in the disengagement position. Clearly the complementary shapes of the plug and the portion supporting the arms carrying the suction cups make it possible to move the plug of the intermediate part into the disengagement position when it encounters the fixed cam on the passage of each of the plugs as the roller rotates. Clearly if a plug in the disengagement position comes to face the cam, this has no effect on the position of the plug, which remains in the disengagement position.

The means just described individually control each valve for automatically establishing communication of a suction cup with the vacuum space during each cycle of rotation of the drum in a manner that is simple, of relatively low cost and particularly reliable in its operation. In other applications of the invention, remote control of the cylinders each pushing on the corresponding plug 46 against a spring urging it toward its retracted position might be preferred.

By way of example, and employing the references shown in FIG. 1, if it is required to remove the second egg from the fourth row O1 and the fourth egg from the fifth row O2 when, as the drum rotates, a first row of suction cups comes into a position vertically below the roller (i.e. the position visible in FIG. 6) at the same time as the fourth row of eggs in the rack passes vertically under the roller, the second cylinder of the row of cylinders pushes the mobile plug associated with the second suction cup of the activated row under the roller. The egg picked up by the resulting depressurization effect and therefore constrained to rotate with the roller is disengaged by rotating the rack, and it should be noted that the direction of rotation of the roller is chosen so as not to impede the movement of the parts and therefore to allow unencumbered disengagement of the egg that has been picked up. The control module controls the rotation of the roller so that the next row of suction cups assumes the active position under the roller at the moment the fifth row of eggs in the rack passes under the roller, where only the fourth cylinder of the row is activated to pick up the egg previously identified as being non-standard.

Clearly the pitch between the rows of suction cups could advantageously be made the same as the pitch between the rows of the rack so that for all the racks the rotation speed and the speed of movement do not change during the picking up process. The speed of rotation of the roller might be modified to adapt to the arrival of a new rack and become constant again if the pitch between the rows of the new rack is the same as before. However, if the pitch between the rows of suction cups is not the same as the pitch between the rows of the rack, it will suffice for the control module to adapt the speed between picking up operations to move a row of suction cups into the active position under the roller synchronously with the passage of a row of a rack under the roller. Depending on the distance the rack still has to travel to reach the roller, the roller is accelerated or slowed for a time that is calculated automatically so that the first row of eggs is correctly aligned relative to a row of suction cups on the roller.

Figure 8:
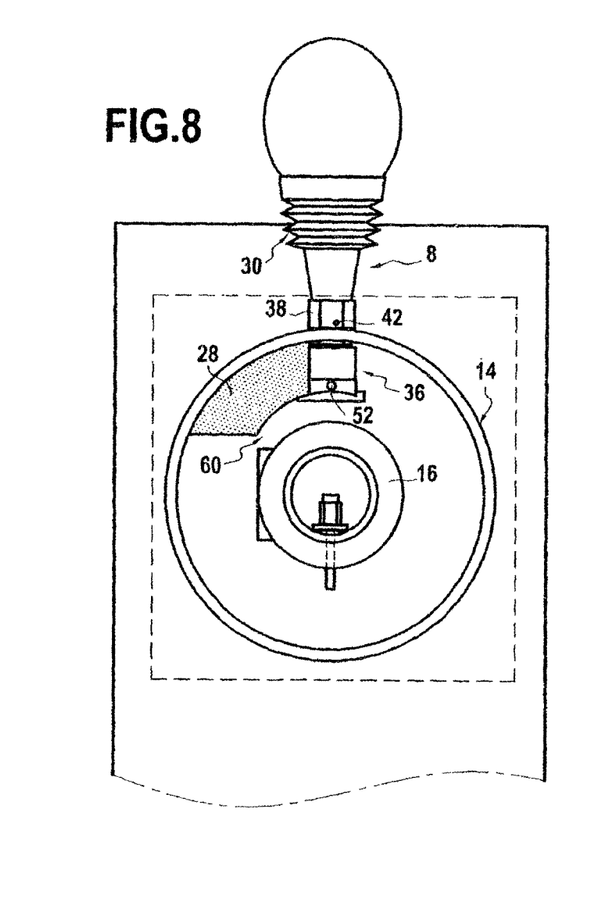
Figure 9:
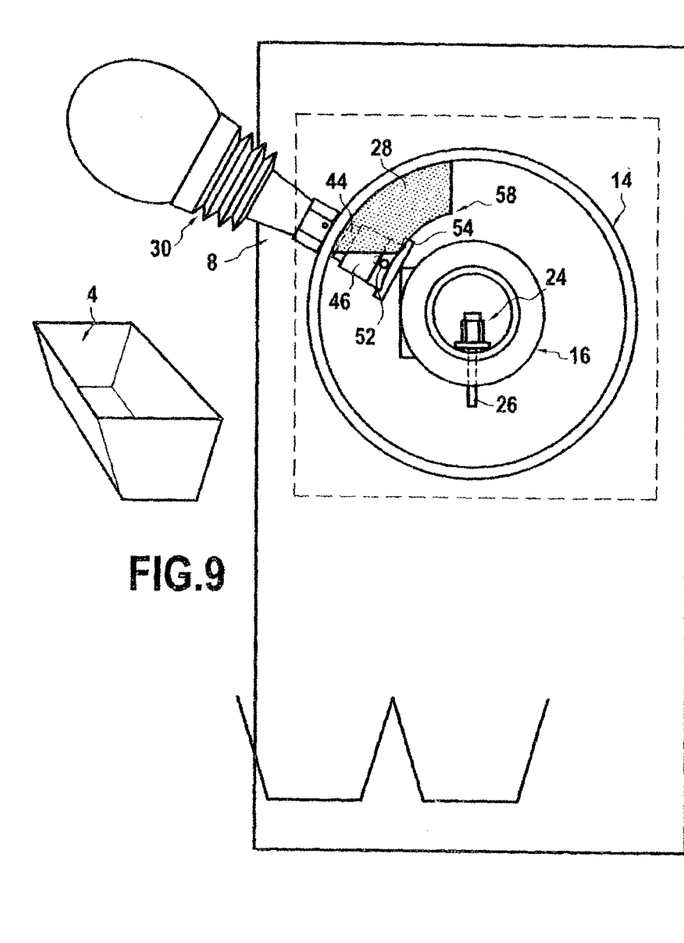

In all cases, the eggs picked up continue to rotate, attached to the roller, because of the suction effect of depressurizing the suction cup, as can be seen in FIGS. 8 and 9. At the end of substantially one half-rotation, the row of arms carrying the suction cups reaches the cam 28 fixedly disposed over the passage of the cylinders controlling the pick-up tools. The adjustment portions with their plug in the engagement position (as can be seen in FIG. 8) come into contact with the initial end of the ramp formed on the cam whereas the adjustment portions with their plug in the disengagement position, i.e. farther from the lateral wall of the roller, escape this contact and remain in the disengagement position. Continuing rotation by virtue of the effect of the contact between the cam and the boss of the mobile plug moves this plug away from the lateral wall of the roller into a disengagement position (which can be seen in FIG. 9) in which the lateral orifices of the tube and the mobile plug are no longer superposed. As a result, the venting effect is not counteracted by the greater effect of the depressurization and this terminates the suction of the egg by the suction cup. The egg is then deposited on the receiving means 4. Clearly the rotation angle before the egg is released depends on the position of the cam, but it would be desirable for that angle to be substantially greater than 180 degrees to release the egg as it moves downward and to disengage it from the suction cup by gravity when it is over the receiving means.

The invention claimed is:

1. An installation for processing parts presenting in series of successive parts on a conveyor driving the parts in movement along a conveyor line through a station for extraction of parts selectively identified as non-standard away from said conveyor belt, wherein said station for extraction of non-standard parts includes a transfer device comprising pick-up tools each adapted to pick up a part from said belt that are carried at the periphery of a rotary drum mounted transversely to said conveyor line and adapted to rotate upon a rotation axis of the drum, wherein each of said tools includes a pneumatic holding head at the end of a carrying arm fixed to an external roller of said drum through which said arm passes toward the rotation axis of the drum, and wherein said arm carrying each tool is of annular shape around an internal duct discharging into said holding head which is in communication with a pressure chamber inside said drum and maintained at a lower pressure than surrounding air, said duct being equipped with a valve for opening and closing said communication to control the corresponding tool to pick up a part and then to release the picked up part as the drum rotates.

2. The installation as claimed in claim 1, wherein the parts are eggs and the holding heads of said tools are suction cups configured to pick up the eggs by suction.

3. The installation as claimed in claim 1, wherein the pick-up tools are individually controlled to pick up or not the part with which the pick-up tools come into contact as the drum rotates according to whether or not the part has been identified as non-standard and to release any part picked up after having driven the part in rotation with the drum and to deposit the part away from an area through which the moving conveyor belt travels.

4. The installation as claimed in claim 1, wherein the roller is driven to rotate by three quarters of a rotation between the position in which a pick-up tool picks up a part on the conveyor belt of standard parts and the position in which the part is released into a receiving bin or deposited on a secondary belt.

5. The installation as claimed in claim 1, wherein each arm carrying one of said tools takes the form of an intermediate part with two portions on respective opposite sides of said roller, namely an internal adjustment portion in said pressure chamber inside the rotary drum and an external portion supporting the pneumatic holding head outside the roller.

6. The installation as claimed in claim 5, wherein said support portion includes a venting orifice and the adjustment portion is adapted to assume a position in which the adjustment portion allows the communication of said head with said chamber inside the drum that is depressurized.

7. The installation as claimed in claim 6, wherein said heads comprise suction cups, said adjustment portion includes a fixed hollow tube fastened to the suction cup at a first end and a mobile plug mounted around a second end of the tube, said plug being mobile between a disengagement position in which the corresponding suction cup is able to release a part picked up previously and an engagement position in which the corresponding suction cup is able to pick up and to hold onto a part facing the corresponding suction cup.

8. The installation as claimed in claim 7, wherein in the engagement position communication is established between the suction cup and the depressurized chamber via the intermediate part and in the disengagement position the mobile plug forms a cover blocking the communication.

9. The installation as claimed in claim 7, wherein in the engagement position the mobile plug of the adjustment portion is situated in a vicinity of a wall of the roller and in the disengagement position the mobile plug of the adjustment portion is at a distance from the wall of the roller.

10. The installation as claimed in claim 7, wherein the tube and the mobile plug each include a lateral orifice, the orifices being conformed to be stacked when the mobile plug is in the engagement position, pushed against a wall of the roller, so as to establish said communication between the suction cup and the depressurized chamber.

11. The installation as claimed in claim 7, wherein the rotary drum includes a cam fixed relative to the rotation of the drum for forcing the mobile plugs into the disengagement position when the roller is in a given angular position.

12. The installation as claimed in claim 11, wherein the cam and the mobile plug have complementary ramped shapes, to move the mobile plug into the disengagement position when the mobile plug encounters the cam.

13. The installation as claimed in claim 7, wherein a pneumatic device carried by the roller is controlled in radial movement relative to the roller, said pneumatic device comprising a cylinder that pushes the adjustment portion against a wall of the roller when the mobile plug is in the engagement position.

14. The installation as claimed in claim 1, further comprising a control module adapted to calculate drum rotation speed instructions to ensure the synchronization of rotation with the movement of the parts on the conveyor belt, the roller being driven in rotation with a speed and a phase synchronized to the movement of the parts.

15. The installation as claimed in claim 1, configured to process poultry eggs, in which a transfer device is disposed downstream in the direction of movement of the eggs on a belt at the output of a visual inspection station checking conformity of the eggs, said transfer device being adapted to transfer non-standard eggs from said belt to a receiver disposed in parallel with the movement of the eggs transversely to the conveyor belt.

* * * * *